United States Patent Office 3,494,832
Patented Feb. 10, 1970

3,494,832
PROCESS FOR THE MANUFACTURE OF
D-LACTIC ACID AND ITS SALTS
Jean Edmond Marie Florent and Leon Ninet, Paris, and Robert Charles Francois Tissier, Maisons-Alfort, Val-de-Marne, France, assignors to Rhone-Poulenc S.A., Paris, France, a French body corporate
No Drawing. Filed Jan. 13, 1967, Ser. No. 609,008
Claims priority, application France, Jan. 17, 1966, 46,178
Int. Cl. C12d 1/02
U.S. Cl. 195—48                  12 Claims

ABSTRACT OF THE DISCLOSURE

D-lactic acid is prepared on an industrial scale by fermentation of a nutrient medium containing sugar and a source of assimilable nitrogen, for example corn steep, using a microorganism capable of producing D-lactic acid from a sugar, said microorganism being insensitive to a substance added to the nutrient medium and which inhibits the growth therein of parasitic organisms. Suitable inhibitors of parasitic organisms in the medium are, for example, mineral salts and antibiotics.

---

This invention relates to the manufacture of D-lactic acid and its salts on an industrial scale.

D,L-lactic and L-lactic acids are prepared in industry by fermentation of a sugar under very advantageous conditions because the fermentation can be carried out without special precautions as to sterility, in simple equipment and with an economical culture medium. The lactobacilli which produces these acids are in fact very vigorous and very robust bacilli which adjust themselves to a high fermentation temperature (50–55° C.) sufficient by itself to eliminate the majority of possible contaminations. The speed of the cultures also contributes to maintenance of the purity of the bacilli (see S. C. Prescott and C. G. Dunn, Industrial Microbiology, 3rd edition, p. 299, McGraw-Hill Co., 1959; L. A. Underkofler, Industrial Fermentation, p. 391, Chemical Publishing Co., 1954).

The manufacture of D-lactic acid on an industrial scale under equally advantageous conditions has not apparently hitherto been achieved. Description of laboratory preparations can be found in the literature, but their transfer to an industrial scale only seems possible if a low cost price for the resulting acid is not required (V. E. Snell, Biochemical Preparations, vol. 3, p. 61, John Wiley and Sons Inc., 1953). The microorganisms which produce D-lactic acid, especially Lactobacillus leichmannii, are in effect less vigorous and less heat-resistant than the bacilli which produce D,L- and L-lactic acids. If the operations are not carried out under rigorously sterile conditions, there is the risk that at any time the cultures may be found contaminated either by other lactobacilli or by other bacterial species whose presence may irreparably comprise the production of the desired acid.

It has now been found, and it is this which forms the object of the present invention, that D-lactic acid may be produced on an industrial scale by fermentation of a sugar without recourse to costly installations which permit fermentation under rigorously sterile conditions, by incorporating in the culture medium one or more substances which inhibit the development of all microorganisms other than the D-lactic acid producing microorganism. The latter must beforehand be acclimatised to the inhibiting substance or substances so that its growth and the production of lactic acid take place normally.

The present invention therefore provides a process for the manufacture of D-lactice acid or salt thereof by fermentation of a nutrient medium containing at least a sugar and a source of assimilable nitrogen using a microorganism known as a producer of D-lactic acid characterised by the addition to the medium of at least one inhibitor of parasitic microorganisms and a microorganism insensitive to the inhibitor and capable of producing D-lactic acid.

The substance or substances inhibiting the growth of parasitic microorganisms in the medium, which may be used, are of very varied types: mineral salts, or organic products which have an antiseptic or antifungal action, and these may be combined in order to achieve more effective protection. In particular, it has been found that the most common antibiotics are very suitable as inhibitors. Other substances such as copper or zinc salts, formaldehyde, quaternary ammonium derivatives and sulphonamides can fulfill the same role.

Amongst the antibiotics which can be used as inhibitors are, for example, the various penicillins, streptomycin, neomycin, kanamycin, chloramphenicol, the various tetracyclins, novobiocin and the various macrolides including spiramycin and polymyxin.

The way in which the present invention is implemented consists of first acclimatising the D-lactic acid producing microorganism to the chosen inhibitor or to the mixture of inhibitors and then carrying out the production culture in the presence of the said inhibitors.

Any reputed D-lactic acid producing microorganism may be used for the purpose, especially Lactobacillus leichmannii, Lactobacillus lactis, and Lactobacillus caucasicus. The adaption of the microorganism to the inhibitor is carried out progressively by cultivating it on a series of liquid or solid media containing increasing concentrations of the inhibitor. When the microorganism develops satisfactorily at a given concentration of the inhibitor it is transplanted on to a medium containing a higher concentration. This operation is repeated until a strain having the desired degree of resistance is obtained, this degree essentially varying with the microbial species and with the chosen inhibitor or inhibitors. In practice, an inhibitor concentration in the nutrient medium is sought which appears to provide appropriate protection against possible contaminations, without exaggerated expenditure. For example, the following may be used: in the case of antibiotics, concentrations of 1 to 200 mg. (preferably about 100 to 299 mg.) per litre; in the case of copper salts, much higher concentrations, e.g. several grams (preferably 1 to 2 grams) per litre.

The culture media described for the manufacture of the other isomers of the acid (see S. C. Prescott and C. G. Dunn, loc. cit., and L. A. Underkofler, loc. cit.) may be used for the manufacture of D-lactic acid by fermentation. The medium recommended by V. E. Snell (loc. cit.) is also suitable. In the present case it is particularly economical to use various types of molasses, and more especially beet molasses, as the source of sugar. The molasses are diluted so as to produce a sugar concentration of 50 to 200 g./l. and preferably of 100 to 130 g./l. in the broth. The medium is completed by adding a source of nitrogen; amongst the various possible mineral, organic or complex sources, corn-steep at a concentration of 10 to 50 g./l. is particularly appropriate.

As the microorganisms which produce D-lactic acid are sensitive to acidity, the latter ought to be at least partially neutralised by means of alkali or alkaline earth hydroxide solutions or, preferably, with carbonates of the same metals. Finally, as in the case of the preparation of D-lactic acid in the laboratory (V. E. Snell, loc. cit.), it may be advantageous to introduce mineral salts, sulphur-containing reducing agents, vitamins and surface-active agents into the medium.

The apparatus used does not require any special device, the only necessary item being a device for heating or cooling the broths. Any cement, wood or metal vat normally used in the fermentation industry, and open to the atmosphere, may be used.

Despite the protection against microbial contaminations conferred by the inhibitor, it may be preferable to sterilise the culture medium at least partially. This can be carried out either directly in the fermentation vat by simple boiling of the complete medium, or in adjoining installations, vats or instantaneous sterilisers, where the various constituents of the medium may be simultaneously or separately raised to an appropriate temperature. In this latter case the components are, after sterilisation, passed into the fermentation vat.

The culture medium is thereafter brought to the fermentation temperature, the chosen inhibitor is added and the medium is inoculated with an inoculum culture previously prepared in the presence of the same inhibitor. Where the chosen inhibitor is not very stable in solution at the fermentation temperature and pH, it may be advantageous to carry out supplementary additions in order to maintain an adequate inhibitor concentration.

The fermentation is allowed to proceed until the sugar has been practically completely consumed, whilst carrying out all the complementary operations which may be necessary for good development of the culture, for example correcting the pH, replenishing the sugar and nitrogen-containing constituents, or adding anti-foaming agents.

The fermentation is generally carried out at the temperature which is considered to be the optimum for the D-lactic acid producing microorganism. However, in order to reinforce the protection conferred by the contamination inhibitors hereinbefore mentioned, it can be worthwhile to work at a temperature higher than this optimum temperature up to 50° C. In certain cases, it is preferable to acclimatise the producing microorganism to this new temperature in order to improve its growth speed and its fermentation capacity. For example *Lactobacillus leichmannii*, which has an optpimum development at 36° C. (Bergey's Manual of Determinative Bacteriology, 7th edition, 1957, p. 548, ed. Williams and Wilkins Company, Baltimore) may be used at a temperature of 47°–50° C.

Once the fermentation is ended, the D-lactic acid may be extracted from the fermentation broths by a standard method. For example, the broth may be filtered at a pH close to 6, and the filtrate collected and evaporated. In this way a salt of D-lactic acid is obtained in a crystalline form. This salt is purified by the usual methods.

The following example illustrates the invention.

EXAMPLE (a) Acclimatisation of the producing microorganism for D-lactic acid

A nutrient medium of the following composition is prepared:

| | | |
|---|---|---|
| Glucose | g | 30 |
| Bacto-tryptone (a trypsic hydrolysate of casein) | g | 5 |
| Yeast extract | g | 5 |
| Polyoxyethylene monooleate of anhydrosorbitol | cc | 2 |
| Crystalline sodium acetate | g | 10 |
| Sodium thioglycollate | g | 0.05 |
| Hydrated ferrous sulphate | g | 0.01 |
| Hydrated manganese sulphate | g | 0.01 |
| 85% orthophosphoric acid | cc | 0.46 |
| Distilled water, q.s.p. 950 cc. | | |

The pH is adjusted to 6.8 with 0.9 cc. of aqueous sodium hydroxide ($d=1.33$) and the mixture is sterilised for 25 minutes at 120° C. An aqueous solution (50 cc.) containing 0.1 g. of L(+)—cysteine hydrochloride and 10 μg. of vitamin B12, sterilised by filtration, is then added. The solution is divided between sterile tubes, 200 mm. long and 25 mm. diameter, giving 20 cc. per tube, and 0.3 g. of calcium carbonate, which has been sterilised dry at 180° C. for 1 hour 30 minutes, is added to each tube. The pH of the mixture is 6.3. The mixture is inoculated with 0.8 cc. of a culture of *Lactobacillus leichmannii* (ATCC 4797) which has been developed in a tube, without agitation, at 37° C. in an identical medium. After 24 hours incubation, again at 37° C. and without agitation, the culture is well developed and is pricked out in tubes of an identical medium whose 20 cc. have had 0.5 cc. of an aqueous solution of 200 mg./l. of spiramycin adipate—equal to 173 mg./l. of spiramycin—sterilised by filtration, added to them. The culture medium thus contains 0.43 mg./l. of spiramycin. After 24 hours incubation at 37° C. without agitation, the culture is well developed and is pricked out into a medium of the same composition but containing 1.73 mg./l. of spiramycin instead of 0.43 mg./l. This is allowed to incubate at 37° C. without agitation. A succession of transfers is carried out under the same conditions into media which are progressively richer in spiramycin, containing 4.3, and then 8.6, 13, 21.5; 30, 43, 60.5, 78, 104, 138, 173, 216 and finally 269 mg./l. of the antibiotic.

(b) Preparation of the inoculum culture

A stoppered 2 litre Erlenmeyer flask is charged with the following nutrient medium:

| | | |
|---|---|---|
| Peptone | g | 7.5 |
| Aminated yeast extract | g | 7.5 |
| Polyoxyethylene monooleate of anhydrosorbitol | cc | 3 |
| Crystalline sodium acetate | g | 15 |
| Sodium thioglycollate | g | 0.075 |
| Hydrated magnesium sulphate | g | 0.3 |
| Sodium chloride | g | 0.015 |
| Hydrated ferrous sulphate | g | 0.015 |
| Hydrated manganese sulphate | g | 0.015 |
| 85% orthophosphoric acid | cc | 0.69 |
| Distilled water q.s.p. 1,275 cc. | | |

The pH is adjusted to 6.1 with 0.5 cc. of aqueous sodium hydroxide ($d=1.33$) and the mixture is sterilised for 45 minutes at 120° C. After cooling, 150 cc. of an aqueous solution containing 75 g. of glucose, sterilised for 20 minutes at 120° C., and 75 cc. of an aqueous solution containing 15 mg. of L(+)—cysteine hydrochloride, 15 μg. of vitamin B12 and 450 mg. of spiramycin adipate—equivalent to 388 mg. of spiramycin—sterilised by filtration, are added; finally, the mixture is completed with 45 g. of calcium carbonate which has beforehand been sterilised dry at 180° C. for 1 hour 30 minutes. The pH of the mixture is 6.2. The mixture is inoculated with 40 cc. of a culture in tubes of the strain which is resistant to 269 mg./l. of spiramycin and the flask is again stoppered with a rubber bung through which a fine tube for the escape of carbon dioxide passes. The mixture is incubated at 37° C. for 30 hours on a shaking table (speed 120 turns/minute, stroke 10 cm.).

(c) Production culture

An 80 litre stainless steel vat of cylindro-conical shape, closed with a removable cover, is charged with the following medium:

| | | |
|---|---|---|
| Beet molasses | kg | 10 |
| Polyoxyethylene monooleate of anhydrosorbitol | cc | 50 |
| Tap water, q.s.p. 45 litres. | | |

The pH is adjusted to 7.0 with 2.5 cc. of sulphuric acid ($d=1.83$) and the mixture heated for 15 minutes to 100° C. After cooling to 45° C., 300 cc. of an aqueous non-sterile solution containing 5 g. of spiramycin adipate—equivalent to 4.3 g. of spiramycin—are added followed by 4 litres of an aqueous solution containing 1.750 kg. of corn-steep (50% solids content) previously adjusted to pH 6.8 by means of 172 cc. of aqueous sodium hydroxide ($d=1.33$) and sterilised for 60 minutes at 122° C. Finally the mixture is completed with 3.250 kg. of unsterilised calcium carbonate. The mixture (50 litres) has a pH of 7.1. The temperature is adjusted to 44° C. by circulating hot water through a stainless steel coil immersed in the broth. The medium is stirred by means of a stirrer with vertical blades, turning at 100 r.p.m., and inoculated with 3 litres of inoculum culture coming from two Erlenmeyer flasks. After 60 hours incubation the pH is 5.5; the broth contains 113 g./l. of D-lactic acid and a residual sugar content corresponding to 5 g./l. of glucose. By reaction with L-lactic dehydrogenase, it is found that the broth does not contain more than 3 g./l. of L-lactic acid.

Extraction of calcium D-lactate

The pH of 17.4 l. of the fermentation broth, prepared under the conditions given above, is adjusted to 6 by means of milk of lime containing the equivalent of 5 g. of quicklime. The medium is stirred and heated at 80° C. for 30 minutes. 700 g. of a filtration aid are then added and the mixture filtered. The filter cake is washed with 5 l. of water heated to 80° C. 20 litres of filtrate containing 94.2 g/l. of D-lactic acid in the form of the calcium salt are thus obtained. The filtrate is concentrated in a flash evaporator in vacuo at 40° C. to a volume of 8 litres. The concentrate is cooled to 25° C. with stirring. After 24 hours the crystalline calcium D-lactate is filtered off and then dried under reduced pressure (8 mm. of mercury) at 60° C. for 48 hours. 2822 g. of crude calcium D-lactate of the following composition:

| | Percent |
|---|---|
| Lactic acid | 54 |
| Calcium | 14 | are thus obtained.

According to a specific enzymatic determination, the product contains less than 1.6% of L-lactic acid. Yield 77%.

The crude calcium salt is recrystallised by dissolving it in 11.25 l. of water heated to 80° C. 140 g. of decolourising charcoal are added and the suspension is then stirred for 10 minutes. After this time, 340 g. of a filtration aid are added and the mixture is filtered. The filtrate is concentrated at 40° C. under reduced pressure down to a volume of 6.35 l. The concentrate is cooled to 25° C. with stirring. After 2 hours the calcium D-lactate is filtered off and then washed with 0.85 litre of water at +5° C. The product is dried for 48 hours under reduced pressure (8 mm. of mercury) at 60° C. In this way 1,500 g. of anhydrous calcium D-lactate of the following composition are obtained:

lactic acid, 78.5% (theoretical for 81.6)
calcium, 17.8% (($CH_3CHOH-COO)_2Ca$ 18.4)

An enzymatic determination of the L-lactic acid by means of a specific dehydrogenase shows that the product contains less than 1.6% of L-lactic acid.

The optical rotatory power is determined by means of zonc D-lactate, prepared by reacting zinc carbonate with the calcium lactate in an aqueous medium, followed by crystallisation.

$$[\alpha]_D^{22} = +6.34° \pm 0.20° \ (c.=7.502, \text{water})$$

Purdie and Walker, Soc. 61, p. 762 (1892), quoted by Beilstein (1921 edition, vol. III, p. 267) give the following data for this salt:

$$[\alpha]_D^{17} = +6.32 \ (c.=6.751, \text{water})$$

We claim:
1. In a process for the manufacture of D-lactic acid or a salt thereof by culture, in a nutrient medium containing at least a sugar and a source of assimilable nitrogen, of a microorganism which converts the said sugar into D-lactic acid, followed by separation of the lactic acid produced as such or as a salt, the improvement which consists in adding to the nutrient medium an effective concentration of at least one inhibitor of parasitic microorganisms and using, as the said microorganism, a D-lactic acid-producing microorganism which has previously been accustomed to the said inhibitor at the said concentration.

2. The improvement according to claim 1 in which the inhibitor is a mineral salt, or organic substance having an antiseptic or antifungal effect.

3. The improvement according to claim 1 in which the inhibitor is an antibiotic.

4. The improvement according to claim 3 in which the antibiotic is a penicillin, streptomycin, neomycin, kanamycin, chloramphenicol, a tetracyclin, novobiocin, spiramycin or polymyxin.

5. The improvement according to claim 4 in which the concentration of the antibiotic inhibitor in the fermentation medium is of 1 to 200 mg. per litre of medium.

6. The improvement according to claim 2 in which the inhibitor is a copper or zinc salt, formaldehyde, a quaternary ammonium derivative or a sulphonamide.

7. The improvement according to claim 1 in which molasses is employed as the source of sugar.

8. The improvement according to claim 1 in which corn-steep at a concentration of 10 to 50 grams per litre of fermentation medium is employed as the source of assimilable nitrogen.

9. The improvement according to claim 1 in which the acidity of the medium during the fermentation is at least partially neutralised by the addition of an alkali or alkaline earth metal hydroxide or carbonate to the medium.

10. The improvement according to claim 1 in which the D-lactic acid producing microorganism employed is *Lactobacillus leichmannii, Lactobacillus lactis* or *Lactobacillus caucasicus*.

11. The improvement according to claim 1 in which the microorganism producing D-lactic acid is accustomed to the inhibitor of parasitic microorganisms by preliminary culture in the presence of increasing concentrations of the inhibitor.

12. The improvement of claim 1, in which the culture is effected at 36° to 50° C.

References Cited

UNITED STATES PATENTS

| 2,964,406 | 12/1960 | Strandskov et al. | 195—123 X |
| 3,202,587 | 8/1965 | Karklign et al. | 195—36 |
| 3,262,862 | 7/1966 | Kitahara et al. | 195—48 |

FOREIGN PATENTS 865,796  4/1961  Great Britain.

OTHER REFERENCES

Von Lorch: Biological Abstracts, vol. 31 (1957), abst. 25357.

Snell: Biochemical Prep., vol. 3, p. 61 (1953).

LIONEL M. SHAPIRO, Primary Examiner

U.S. Cl. X.R.

195—112, 121